Patented Apr. 9, 1935

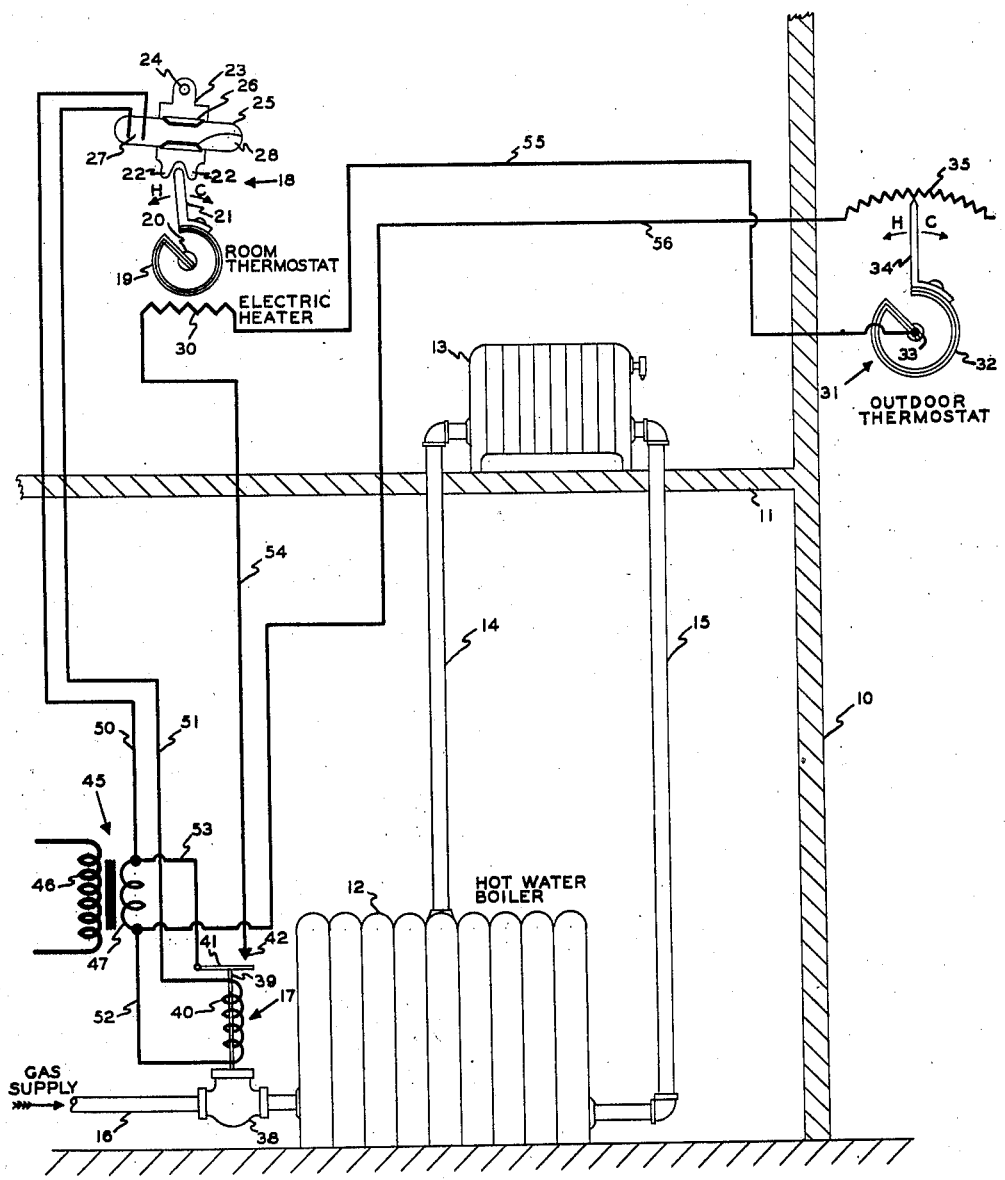

1,997,559

UNITED STATES PATENT OFFICE 1,997,559

AUTOMATIC CONTROL SYSTEM

William J. Hajek, Brookline, Mass., assignor to Minneapolis-Honeywell Regulator Company, Minneapolis, Minn., a corporation of Delaware Application July 7, 1934, Serial No. 734,113

20 Claims. (Cl. 236—91)

The present invention relates to automatic control systems and particularly to automatic temperature control systems, such as heating systems.

It is well known that in heating systems, for example, there is generally a delay between the generation of heat or the application thereof to a space to be heated and an actual increase in the space temperature. Taking the case of a hot water heating system, upon a demand for heat by the space or room thermostat so as to increase the rate of combustion, a period of time elapses before the water in the boiler becomes heated and is transmitted to the radiator or other heating device either by gravity or forced circulation. There is a further delay before this heat is transmitted from the radiator or other heating device to the space or room to be heated. Then, when the space or room thermostat becomes satisfied and decreases the rate of combustion, there is considerable heat stored up not only in the radiator or other heating device, but in the hot water and boiler as well. As a result, heat continues to be transmitted to the room or space after the temperature thereof has been raised to the desired point as indicated by the usual thermostat, so that by the time the heat stored in the radiator or heater and the heating system as a whole has been dissipated, the room or space temperature is generally considerably higher than the desired point at which the controlling thermostat operated to decrease the rate of combustion.

In order to overcome this difficulty, commonly known as "over-shooting", it has been heretofore proposed to change the response of the controlling thermostat, during the time heat is being generated and dissipated to the room or space, in such a manner that the controlling thermostat becomes satisfied and decreases the rate of combustion before the room or space temperature has been fully restored to the desired value. In this manner, while the rate of combustion is decreased prior to the time that the room or space temperature is completely restored, the heat stored up in the radiator or heating system as a whole is sufficient to continue to raise the room temperature to or above the desired point. This change in the response of the controlling thermostat is most generally accomplished in electrical systems of automatic control by subjecting the controlling thermostat to a source of auxiliary heat which acts to raise slightly the temperature of the thermostat above the room or space temperature without materially affecting the actual room or space temperature, this auxiliary source of heat generally taking the form of an electric heater or electric lamp which is placed in proximity to the controlling thermostat and is energized directly or indirectly by the controlling thermostat during a call for heat.

It has been found that this difficulty of overshooting is more pronounced during warm or mild weather than it is during cold or severe weather. This is probably due to the fact that the heat losses vary at a greater rate than does the heat storage capacity of the heating system. In the prior art systems in which the response of the controlling thermostat has been changed during the time that the same is demanding heat, it has been common practice to make this change in response uniform for all outdoor temperature conditions. As a result, if the value of the change of the response is selected so as to give the best results during warm or mild weather conditions, then it necessarily follows that this value of change in response is too great for colder or more severe weather when the over-shooting is inherently of a lesser degree. Similarly, if the value of the change in response is selected so as to produce the best results in cold or severe weather, then this over-shooting is not sufficiently corrected during warm or mild weather when it is the greatest.

One of the objects of the present invention, therefore, is the provision of a control system in which the main condition responsive control device has its response varied in accordance with the demands on the system during at least a portion of the time that the condition changing means is being operated to restore the condition to be controlled to the desired value.

More particularly, an object of the present invention is the provision of a temperature control system in which the response of a main controlling thermostat is changed upon changes in the demand upon the temperature changer and during such times as the temperature changer is in operation. This change in demand is preferably measured by changes in outdoor weather conditions such as changes in the outdoor temperature.

A further object of the invention is the provision of a heating system in which the main controlling thermostat has its response changed or varied during a call for heat by a second thermostat which responds to changes in outdoor temperature. Preferably, the variation in response of the main controlling thermostat is modulated or proportioned in accordance with variations in the outdoor temperature.

In the specific embodiment to be hereinafter described, the change in response of the main controlling thermostat is obtained by an electrical heating means which is energized by the main controlling thermostat upon a call for heat, and the current flow to this heating means is controlled by an outdoor temperature responsive thermostat which preferably takes the form of a temperature responsive variable resistance whereby the current flow to the auxiliary heating means is varied in accordance with the changes in outdoor temperature.

Other objects of the invention will be found in the detailed description, the drawing, and the appended claims.

For a more complete understanding of the invention, reference may be had to the following description and the accompanying single drawing which is a diagrammatic representation of one form of the present invention.

Referring to the drawing, the outside wall of a house or building is indicated at 10 and the floor is indicated at 11. The house or building is shown as being heated by a hot water boiler 12 which supplies hot water to a radiator or other heating device 13 by means of a supply pipe 14. The water, after having passed through the radiator 13, is returned to the boiler 12 by means of a return pipe 15. The boiler 12 is heated by a burner (not shown) to which fuel is supplied by a fuel supply pipe 16, herein shown as a gas supply pipe, the flow of fuel through which is controlled by an electrically operated gas valve 17.

The gas valve 17 is controlled by a main controlling condition responsive device generally indicated at 18 which is herein shown as a mercury switch type room thermostat. This room thermostat 18 includes a coiled bimetallic actuator 19 having one of its ends fixed at 20. The other end of the actuator 19 controls a member 21, the free end of which is disposed between the prongs 22 of a mercury switch carrying member 23 that is pivoted at 24. This mercury switch carrying member 23 carries a mercury switch 25 by means of a mercury switch clip 26. The mercury switch 25 is provided with the usual electrodes 27 and a globule of mercury 28 for bridging the electrodes 27 when the room or space temperature falls below the desired value.

The response of the thermostat 18 is herein shown as adapted to be changed by means of an electric heating element 30 which is controlled conjointly by the thermostat 18 and by an outdoor resistance type thermostat generally indicated at 31. This outdoor resistance thermostat 31 includes a coiled bimetallic actuator 32 which is fixed at one end, as indicated at 33, and controls a movable member 34 that is adapted to sweep back and forth across a resistance element indicated at 35.

The gas valve 17 is shown as comprising a casing 38 having the usual valve opening and valve disc therein (not shown) and an actuating stem 39 which is controlled by an electromagnetic coil 40. The valve 17 also is shown as acting as a relay in that upon energization of the electromagnetic winding 40 and raising of valve stem 39, a switch arm 41 is moved into engagement with a cooperating contact 42.

Low voltage electrical power is supplied to the control system by means of a step-down transformer indicated at 45 having a high voltage primary 46 connected to a suitable source of power, and a low voltage secondary 47. The detailed circuit connections will be described under the heading "Operation".

*Operation*

With the parts in the position shown, the room or space temperature is above the desired point since the mercury 28 is disengaged from the electrodes 27 of the mercury switch 25. The gas valve 17 is closed and no heat is being furnished to the hot water boiler 12. Also, the auxiliary heater 30 is deenergized. The outdoor temperature is intermediate since the movable member 34 is engaged with substantially the central portion of the resistance element 35.

After a time period, depending upon the heat loss from the building and other well known factors, the room temperature will fall below the desired value and the member 21 will engage the right-hand prong 22 of carrying member 23 to tilt the mercury switch 25 in a counter-clockwise direction about its pivot 24, whereupon the mercury 28 will move to the left-hand end of the mercury switch 25 and bridge the electrodes 27 thereof. An energizing circuit for the gas valve 17 is thereupon established as follows: Secondary 47 of transformer 45, wire 50, electrodes 27 and mercury 28 of mercury switch 25, wire 51, electromagnetic winding 40, and wire 52 to the other side of secondary 47. Gas is thereby permitted to flow to the boiler 12 and is ignited in any of the usual manners. Raising of the valve stem 39 to open the gas valve 17 moves switch arm 41 into engagement with contact 42 whereupon the auxiliary heater 30 is energized as follows: Secondary 47, wire 53, switch arm 41, contact 42, wire 54, auxiliary heater 30, wire 55, bimetallic element 32, movable member 34, resistance element 35, and wire 56 to the other side of secondary 47. By reason of the central position of movable member 34 upon resistance element 35, the flow of current to the auxiliary heater 30 will have an intermediate value so that the heating effect of the auxiliary heater 30 upon the thermostat 18 is intermediate.

The water in the boiler is now being heated, and this heated water will circulate through the radiator 13 and in turn heat the room or space to be heated. The heat supplied by the auxiliary heater 30 will slightly change the response of the room thermostat 18 so that a smaller increase in room temperature is needed to open mercury switch 25 than would be required if this auxiliary heating effect were not supplied. As a result, when the room or space temperature approaches the desired value, the combination of the room or space temperature and the auxiliary heat provided by heater 30 will cause the member 21 to engage the left-hand prong 22 of member 23 and return the mercury switch 25 to the position shown in the drawing. When this occurs, the electromagnetic winding 40 is deenergized and the gas valve 17 closes. Closure of the gas valve 17 causes downward movement of its valve stem 39 whereupon switch arm 41 moves from engagement with contact 42, and the heater 30 is deenergized. The suplemental heat is thereby removed from the room thermostat, but the resulting drop in the temperature of its bimetallic element 19 is not sufficient to reclose the mercury switch 25 by reason of the differential upon which the thermostat operates. In the meantime, the radiator 13 will continue to deliver heat to the room or space by reason of the heat stored in the radiator, boiler, and circulating water so that the room temperature will be completely restored without any over-shooting providing the amount of auxiliary heat furnished by heater 30 has been properly selected for the particular heating system.

If the outdoor temperature should rise, movable member 34 will move towards the left-hand end of resistance element 35 thereby decreasing the amount of resistance in circuit with the auxiliary heater 30 so that the auxiliary heater 30 gives off more heat to the room thermostat. In this manner the change in response of the room thermostat 18 is made greater as the outdoor temperature rises so as to cause the gas valve 17 to close at progressively lower room temperatures. However, under these milder weather conditions, the heat stored in the radiator, boiler, and circulating water at the time the gas valve 17 is closed will be sufficient to raise the room or space temperature a larger amount by reason of the decrease in heat losses due to the milder weather conditions. Similarly, upon a fall in outdoor temperature, the movable member 34 moves along the resistance element 35 towards the right-hand end thereof, so as to increase the resistance in series with the auxiliary heater 30. As a result, whenever the gas valve 17 is opened, the heater 30 will supply less heat to the room thermostat and thereby change its response to a smaller extent whereby the room temperature must become more nearly restored before the gas valve 17 will be closed. Under these conditions, the heat stored in the radiator 13, boiler 12, and circulating water will not cause a very large further rise in the room or space temperature since the heat losses are considerably larger due to the more severe weather conditions.

In this manner, by varying the change in the response of the condition responsive device or main controlling room thermostat in accordance with the demands as measured by changes in outdoor temperature, the proper amount of "anticipation" is supplied for all weather conditions to obviate over-shooting of the room temperature.

It will be understood that the present invention is applicable to all types of temperature controlling systems and heating systems as well as to other systems of automatic control of a condition, and that it is contemplated that all of the usual auxiliary controls and safety devices generally utilized in such control systems will be included.

While a specific embodiment of the invention has been shown as applied to a hot water heating system, it will be appreciated that many changes could be made by those skilled in the art without departing from the invention, and I am therefore to be limited only by the scope of the appended claims.

I claim:

1. A system of the class described, comprising, in combination, a heater for heating a space, a space temperature responsive thermostat, an auxiliary heating means for locally heating said thermostat, connections between said thermostat, heater and auxiliary heating means by which said thermostat operates said heater to supply more heat and operates said auxiliary heater to heat the thermostat locally upon a call for heat, and an outdoor temperature responsive thermostat for varying the effect of said auxiliary heating means upon said space temperature responsive thermostat.

2. A system of the class described, comprising, in combination, a heater for heating a space, a space temperature responsive thermostat, an auxiliary heating means for locally heating said thermostat, connections between said thermostat, heater and auxiliary heating means by which said thermostat operates said heater to supply more heat and operates said auxiliary heater to heat the thermostat locally upon a call for heat, and an outdoor temperature responsive thermostat associated with said auxiliary heating means for increasing its heating effect upon said space temperature responsive thermostat in response to a rise in the outdoor temperature.

3. In combination, a heater for heating a space, a space temperature responsive thermostat for increasing the heating effect of said heater upon the space when the space temperature falls to a predetermined minimum, an auxiliary heating means for locally heating the space temperature responsive thermostat, connections between said space temperature responsive thermostat and auxiliary heating means by which the former causes operation of the latter while the space is being heated, and means responsive to changes in the demands on said heater and associated with said auxiliary heating means for varying its effect upon said space temperature responsive thermostat.

4. In combination, a heater for heating a space, a space temperature responsive thermostat for increasing the heating effect of said heater upon said space when the space temperature falls to a predetermined minimum, an auxiliary heating means for locally heating the space temperature responsive thermostat, connections between said space temperature responsive thermostat and auxiliary heating means by which the former causes operation of the latter while the space is being heated, and means responsive to changes in demand on said heater and associated with said auxiliary heating means for decreasing its effect upon said space temperature responsive thermostat as the outdoor temperature decreases.

5. In combination, means for heating a space, an auxiliary heater, a space temperature responsive thermostat for substantially simultaneously causing said heating means to heat said space and for rendering said auxiliary heater operative upon a call for heat, said auxiliary heater being associated with said space temperature responsive thermostat for locally heating the same, and an outdoor temperature responsive thermostat for controlling the effect of said auxiliary heater upon the space temperature responsive thermostat.

6. In combination, means for heating a space, an auxiliary heater, a space temperature responsive thermostat for substantially simultaneously causing said heating means to heat said space and for rendering said auxiliary heater operative upon a call for heat, said auxiliary heater being associated with said space temperature responsive thermostat for locally heating the same, and an outdoor temperature responsive thermostat for varying the effect of the auxiliary heater upon said space temperature responsive thermostat in accordance with changes in the outdoor temperature.

7. In combination, heating means for heating a space, an auxiliary heater, a space temperature responsive thermostat for substantially simultaneously rendering said heating means and auxiliary heater operative and inoperative in accordance with temperature fluctuations at said thermostat, the auxiliary heater being arranged to heat the space temperature responsive thermostat locally, and an outdoor temperature responsive thermostat for controlling the effect of said auxiliary heater upon said space temperature responsive thermostat.

8. In combination, heating means for heating a space, an auxiliary heater, a space temperature responsive thermostat for substantially simultaneously rendering said heating means and auxiliary heater operative and inoperative in accordance with changes in temperature at said space temperature responsive thermostat, and auxiliary heater being arranged to heat the space temperature responsive thermostat locally, and an outdoor temperature responsive thermostat for increasing and decreasing the heating effect of said auxiliary heater upon the space temperature responsive thermostat in accordance with the rise and fall in outdoor temperature.

9. A system of the class described, comprising, in combination, electrically operable means in control of the supply of heat to a space, an auxiliary electrical heater, a space temperature responsive thermostatic switching means for starting and stopping said electrically operable means and for energizing and deenergizing said electrical heater, the electrical heater being arranged to heat the space temperature responsive switching means locally, and means responsive to the demands on said heater for changing the current flow through said electrical heater.

10. A system of the class described, comprising, in combination, electrically operable means in control of the supply of heat to a space, an auxiliary electrical heater, a space temperature responsive thermostatic switching means for starting and stopping said electrically operable means and for energizing and deenergizing said electrical heater, the electrical heater being arranged to heat the space temperature responsive switching means locally, and an outdoor temperature responsive variable resistance means associated with the electrical heater for decreasing the current flow therethrough upon a fall in the outdoor temperature.

11. In combination, electrically operable means in control of the supply of heat to a space, a space temperature responsive thermostat, electrical means for changing the response of said thermostat, energizing circuits for said electrically operable heat supply control means and electrical response changing means controlled by the space temperature responsive thermostat by which the supply of heat to the space is increased and the response of said space temperature responsive thermostat is changed to respond to a lower space temperature upon a call for heat, and an outdoor temperature responsive thermostat associated with the electrical response changing means for changing its action upon the space temperature responsive thermostat.

12. In combination, electrically operable combustion controlling means for increasing combustion when energized, a room thermostat, an electrical heater for locally heating the room thermostat, connections controlled by the room thermostat upon a call for heat for energizing the combustion controlling means and electrical heater, and an outdoor temperature responsive thermostat for additionally controlling said electrical heater.

13. In combination, electrically operable combustion controlling means for increasing combustion when energized, a room thermostat, an electrical heater for locally heating the room thermostat, connections controlled by the room thermostat upon a call for heat for energizing the combustion controlling means and electrical heater, and an outdoor temperature actuated variable resistance in series with the electrical heater and arranged to decrease the current flow thereto as the outdoor temperature falls.

14. The combination with an auxiliary heater for locally heating a space temperature responsive thermostat while such thermostat is calling for heat, of an outdoor temperature responsive thermostat for controlling the amount of heat supplied to the space temperature responsive thermostat by the auxiliary heater.

15. The combination with an electric heater for locally heating a room thermostat while the same is calling for heat, of current varying means responsive to changes in outdoor temperature for varying the flow of current to the electric heater whereby to vary the amount of heat delivered thereby to the room thermostat.

16. In a temperature control system, in combination, a main temperature changer for changing the temperature of a space to be controlled, a space temperature responsive thermostat in control of the temperature changer, an auxiliary temperature changer also controlled by the space temperature responsive thermostat and adapted to affect the temperature of the space temperature responsive thermostat locally, and means responsive to demands upon the main temperature changer for additionally controlling the auxiliary temperature changer.

17. In combination, a heater for heating a circulating fluid for heating a space, an auxiliary electric heater, a space temperature responsive thermostat for placing both of said heaters in operation upon a call for heat, the auxiliary electric heater being arranged to heat the space temperature responsive thermostat locally, and an outdoor temperature responsive thermostat for additionally controlling the electric heater.

18. In combination, a heater for heating a circulating fluid for heating a space, an auxiliary electric heater, a space temperature responsive thermostat for placing both of said heaters in operation upon a call for heat, the auxiliary electric heater being arranged to heat the space temperature responsive thermostat locally, and an outdoor temperature responsive variable resistance means for varying the current flow to the electric heater in accordance with changes in the outdoor temperature.

19. In combination, a main condition changing device for changing a condition to be controlled, an auxiliary condition changing device, a condition responsive control for placing both of said condition changing devices in operation upon a deviation of the controlled condition in a predetermined direction, the auxiliary condition changing device being adapted to affect the condition responsive control locally, and means responsive to the demand upon the main condition changing device for controlling the effect of the auxiliary condition changing device upon the condition responsive control.

20. In combination, a main temperature changer for changing the temperature of a space to be controlled, an auxiliary temperature changer, a space temperature responsive thermostat for placing both of said temperature changers into operation upon a deviation of the space temperature in one direction, the auxiliary temperature changer being arranged to affect the space temperature responsive thermostat locally, and an outdoor temperature responsive thermostat for controlling the effect of the auxiliary temperature changer upon the space temperature responsive thermostat.

WILLIAM J. HAJEK.